United States Patent Office 3,480,481
Patented Nov. 25, 1969

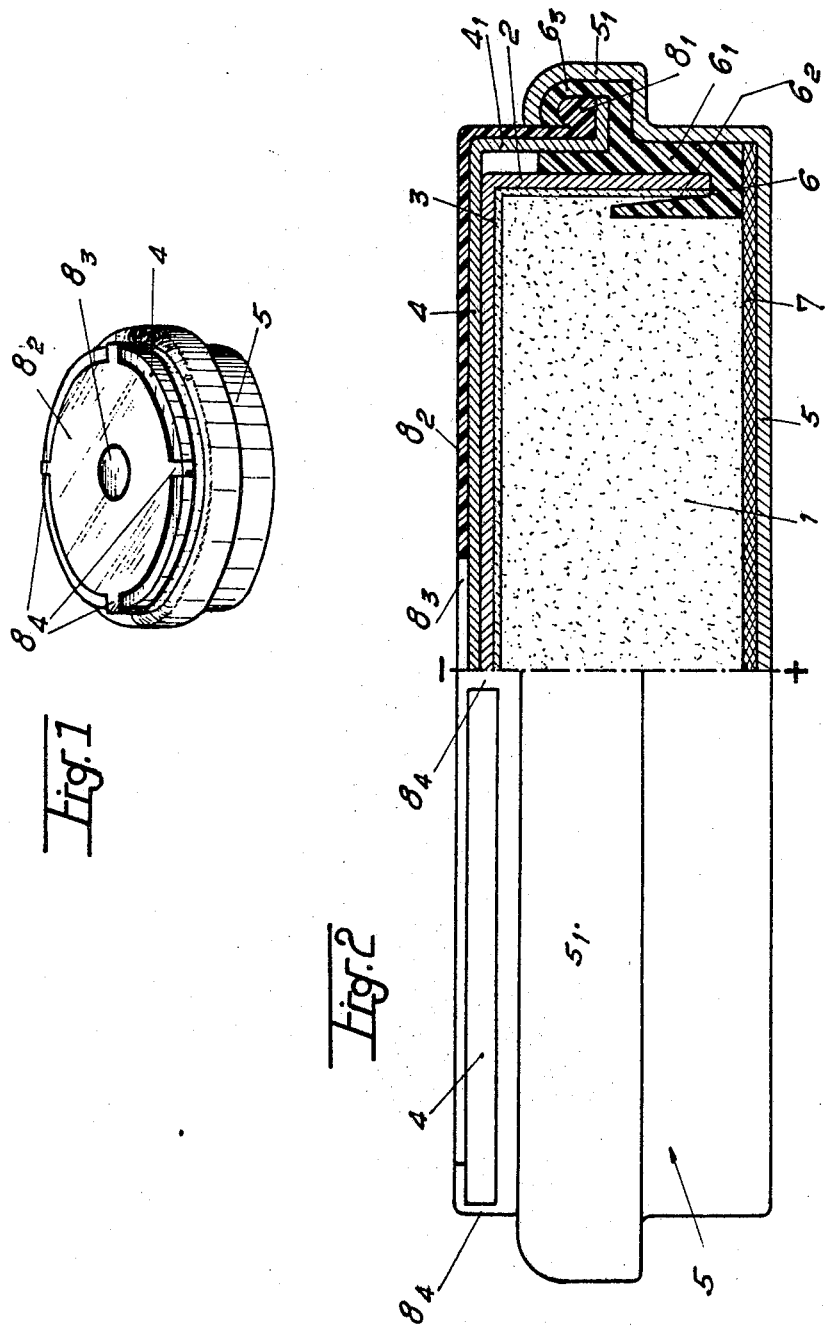

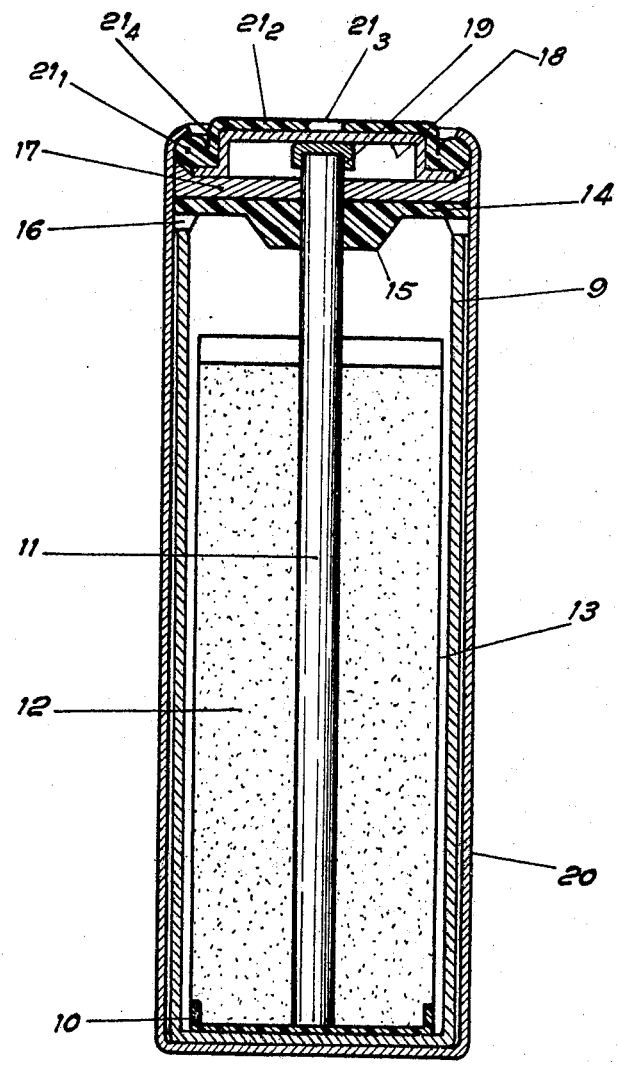

3,480,481
ELECTROCHEMICAL GENERATOR
Adrien Gauthier, Saint-Ouen, and Maurice M. P. Garcin, Paris, France, assignors to Societe Les Piles Wonder, a corporation of France
Filed Feb. 12, 1968, Ser. No. 704,772
Claims priority, application France, Feb. 17, 1967, 94,500
Int. Cl. H01m 21/00
U.S. Cl. 136—111     4 Claims

ABSTRACT OF THE DISCLOSURE

A battery including two opposed upper and lower shell members united along their opposing edges, each shell member comprising a battery terminal. One of the shell members is protected by a piece of insulating material, the periphery of which is disposed between the opposing edges of said shell members. A central part of the piece of insulating material substantially overlies the base wall of one shell member and is connected to the peripheral part of said material by a plurality of connecting elements, which are easily broken to permit removal of the central part.

---

The present invention is directed to an electrochemical generator of the type comprising an electrochemical couple inside a casing formed by two opposite half-shells which are joined by crimping.

Electrochemical elements of this type or so-called "button" cells are already known. In the majority of cases, they are of small size, of cylindrical shape, and have a thickness which is small compared with their cross-section. The casing is accordingly composed of two opposite half-shells which constitute the positive and negative poles. Another class of electrochemical elements of the same type is constituted by dry cells such as those described, for example, in the fourth addition No. 86,295 to French Patent No. 1,263,347 in the name of the present applicant as applied-for on Aug. 11, 1964, and granted on Nov. 29, 1965. The two half-shells which form the casing are in this case designed in the form of a cylindrical can which is crimped to a cover.

One of the objects of the present invention is to produce a generator of the type referred-to but which provides the user with an absolute guarantee that said generator has not been discharged either accidentally or intentionally or to either a partial or whole extent, even if no special precautions have been taken in regard to storage.

Another object of the invention is to produce a generator of improved design as stated without thereby increasing its cost price and without giving rise to difficulties either for the manufacturer or for the user.

The above-mentioned objects are achieved in accordance with the invention by virute of the presence of a member of insulating material which is adapted to cover one of the half-shells in order to constitute a shield, the periphery of said insulating member being adapted to form an annular insulating seal interposed between said half-shell and the edge of the other half-shell which is turned inwards by crimping.

Preferably, the central portion of the insulating member which forms the shield is joined to the peripheral portion which forms the annular seal by means of very small ties which can readily be cut.

As an advantageous feature, the portion of the insulating member which forms the shield is provided with a central opening.

It is apparent that, by means of a single part which is extremely low in cost price and easy to fit, it is thus possible to achieve both the degree of leak-tightness which is essential for the element and the certainty that this latter cannot be discharged either accidentally or intentionally prior to use inasmuch as one of the poles of the element which is formed by one of the half-shells is covered by an insulating member. However, the user has no difficulty in breaking-off the insulating member when the element is put into service since it is merely necessary to cut the small ties which serve to retain the central portion of the insulating member which forms a shield. Finally, the central opening of said member permits of ready inspection of the element during storage.

The invention will in any case be readily understood from the description which now follows below, reference being made to the accompanying drawings which show two forms of construction by way of non-limitative example, and in which:

FIG. 1 is a view in perspective on a small scale and showing an element in accordance with the invention;

FIG. 2 shows on a larger scale the same element in half-section and in half-elevation; and FIG. 3 is a sectional view of another element in accordance with the invention.

The element which is illustrated in FIGS. 1 and 2 comprises a cathode 1 or depolarizing mass having a base of manganese dioxide, for example, and an anode 2 having the shape of an inverted cup which can be formed of zinc. Said cathode and anode are separated by a layer 3 of electrolyte together with its support if this latter is provided. This assembly is disposed within a casing which is formed by an upper half-shell 4 which constitutes the negative pole of the element and a lower half-shell 5 which constitutes the positive pole and is formed either of nickel-plated iron or stainless steel, for example, said half-shells being separated by an annular insulating member 6.

More precisely, the insulating member 6 comprises a central cylindrical portion $6_1$ flanked by an inner lip $6_2$ which defines a channel for accommodating the anode 2 (with the electrolyte 3) and an outer lip $6_3$, the function of which will be explained later.

The upper half-shell 4 is in turn provided at its periphery with a flange $4_1$ which is adapted to fit in the bottom of the channel defined by the lip $6_3$ of the insulating member 6.

Finally, the half-shell 5 which is separated from the cathode by a conductive sheet 7 has an extension in the form of an edge $5_1$ which fits round the lip $6_3$ in such a manner as to be crimped onto the flange $4_1$ of the half-shell 4.

However, in accordance with the invention, an annular seal $8_1$ formed of insulating material has been interposed prior to crimping and extends to a central portion $8_2$ which covers the upper half-shell 4.

Said single member 8, which can be provided with a central opening $8_3$ of circular shape has advantageously been fabricated, for example by molding of polythene, in such a manner that the portion $8_1$ is joined to the portion $8_2$ by a suitable number (namely four as shown in the figures) of small ties or elements $8_4$.

It is apparent from a study of FIG. 1 that the element thus constructed is protected against any accidental or intentional discharge by means of the portion $8_2$ of the member 8 which thus constitutes a shield. However, the central opening $8_3$ permits of inspection of the element during storage. Finally, the user can break the small ties $8_4$ without any difficulty when the element is to be put into service. Moreover, the portion $8_1$ of the member 8 constitutes an excellent seal between the two half-shells 4 and 5.

Referring now to FIG. 3, there is again shown an electrochemical element comprising an inner can 9 fitted at the bottom with an insulating member 10 on which is applied a central electrode 11 surrounded by the cathode 12 which may be provided if necessary with a support 13. The electrode is passed through a washer 14 which is usually formed of plastic material, provided with an appendage 15 and radial cuts 16, then through a washer 17 against which the cover 18 is applied. Said cover constitutes one of the poles of the element since it is in contact with the capsule 19 which covers the electrode 11. The cylindrical can 20 which forms the outer casing of the element together with the cover is crimped onto the edge of the cover 18. In accordance with the invention, the crimping operation is carried out with interposition of an annular insulating seal $21_1$, this latter being provided with an extension in the form of a central portion $21_2$ to which it is attached by means of small ties $21_4$ (which may be four in number, for example). The central portion $21_2$ which extends over the cover 18 is advantageously provided with an opening $21_3$. The single member 21 is similar to the single member 8 of FIGS. 1 and 2 and has the same advantages.

It will in any case be understood that the forms of execution of the invention which have just been described have been given solely by way of non-limitative example and that a large number of modifications can be contemplated without thereby departing from the scope of the invention. In particular, the invention applies to alkaline-electrolyte elements of the rechargeable or nonrechargeable type.

What we claim is:

1. A battery, comprising:
    casing means including two opposed upper and lower shell members, each comprising a battery terminal, each member having base wall means and sidewall means fixedly secured to the base wall means and extending outwardly therefrom, the sidewall means of each said shell member having a free edge portion opposed and adjacent to that of the other shell member, the free edge portion of the said lower shell member being crimped to overlie the free edge portion of the upper shell member and form a connecting joint therebetween; and
    means for protecting said upper shell member, said means including a piece of insulating material having a central part thereof disposed over and substantially covering the base wall means of said upper shell member, said piece of insulating material also including an annular part disposed between the free edge portions of said two shell members for insulating said cup-shaped members from each other and for creating an airtight annular connecting joint therebetween, and said protecting means further including a plurality of small elements interconnecting said central part and said annular part, whereby said plurality of small elements can be easily broken for permitting removal of said central part.

2. A battery according to claim 1, wherein the central part of said piece of insulating material has a central opening disposed directly over the base wall means of said upper shell member.

3. A battery according to claim 1, wherein said annular part surrounds said central part and is spaced therefrom by an annular opening, said plurality of small elements being circumferentially spaced along said annular part and bridging said opening for integrally interconnecting said central part and said annular part.

4. A battery according to claim 1, wherein said lower shell member is a cylindrical can and said sidewall means of said lower shell member extends away from the base wall means thereof a distance substantially greater than the corresponding extension of the sidewall means on said upper shell member; and
    wherein said free edge portion of said lower shell member projects inwardly of its sidewall means and said free edge portion of said upper shell member projects outwardly from its sidewall means.

References Cited

UNITED STATES PATENTS

| 2,812,377 | 11/1957 | Franquemont | 136—111 |
| 2,951,891 | 6/1960 | Kempf et al. | 136—111 |
| 2,995,614 | 8/1961 | Krueger | 136—111 |

FOREIGN PATENTS

| 929,367 | 6/1963 | Great Britain. | |

WINSTON A. DOUGLAS, Primary Examiner

C. F. LE FEVOUR, Assistant Examiner